United States Patent [19]

Onodera et al.

[11] Patent Number: 4,473,288
[45] Date of Patent: Sep. 25, 1984

[54] PHOTOGRAPHIC DEVICE WITH SCREEN FOR CONTROLLING GRADATION OF PHOTOGRAPHED IMAGE

[75] Inventors: Kaoru Onodera; Satoru Hohnishi; Kazuyuki Kobayashi; Kazuo Shiozawa, all of Hino, Japan

[73] Assignee: Konishiroku Photo Industry Co., Ltd., Tokyo, Japan

[21] Appl. No.: 447,524

[22] Filed: Dec. 7, 1982

Related U.S. Application Data

[63] Continuation of Ser. No. 234,328, Feb. 13, 1981, abandoned.

[30] Foreign Application Priority Data

Feb. 13, 1980 [JP] Japan ................................ 55-15510

[51] Int. Cl.³ .......................... G03B 7/28; G03B 11/00
[52] U.S. Cl. .................................. 354/432; 250/214 P
[58] Field of Search ................... 354/22, 23 R, 23 D, 354/31, 42, 43, 59, 227, 230, 271, 410, 432, 227.1; 355/38, 41, 71; 350/333; 250/214 P

[56] References Cited

U.S. PATENT DOCUMENTS

| | | | |
|---|---|---|---|
| 3,955,208 | 5/1976 | Wick et al. | 354/227 |
| 4,040,067 | 8/1977 | Kondo | 354/23 D |
| 4,047,187 | 9/1977 | Mashimo et al. | 354/23 D |
| 4,050,814 | 9/1977 | McFadden | 354/227 X |
| 4,054,890 | 10/1977 | Shimomura | 354/23 D X |
| 4,162,831 | 7/1979 | Gold | 354/31 |
| 4,176,955 | 12/1979 | Yamada et al. | 354/31 X |

FOREIGN PATENT DOCUMENTS 2557047 4/1977 Fed. Rep. of Germany ...... 350/333

Primary Examiner—William B. Perkey
Attorney, Agent, or Firm—Frishauf, Holtz, Goodman and Woodward

[57] ABSTRACT

In a photographic device, there are provided (a) a means for measuring luminous intensity distribution on an object and (b) a screen means for controlling gradation of an image to be formed on a photosensitive material in accordance with the luminous intensity distribution and/or maximum/minimum luminous intensity difference of the object measured by the means (a).

27 Claims, 5 Drawing Figures

PHOTOGRAPHIC DEVICE WITH SCREEN FOR CONTROLLING GRADATION OF PHOTOGRAPHED IMAGE

This is a continuation of application Ser. No. 234,328, filed Feb. 13, 1981, now abandoned.

This invention relates to a photographic device such as a camera or the like, and particularly concerns a photographic device which is provided with a means for regulating the gradation of the photographic material used therein.

In photographing, it is important to select the gradation of photosensitive materials. Photosensitive materials having harder gradation is suitable for objects of a smaller maximum/minimum luminous intensity ratio while photosensitive materials of softer gradation is preferable for objects having a larger maximum/minimum luminous intensity difference. If a photosensitive material of relatively hard gradation is used to take an object having a larger maximum/minimum luminous intensity difference, the resultant photograph would have indefinite details in both the shade and high-exposure portions thereof. This problem becomes severe, particularly, in a photosensitive material of relatively narrow exposure range such as color reversal film and instant print film. In order to overcome such a problem, there has been proposed a method for regulating the gradation of the photosensitive material by means of a screen located in front of the lens of a camera or the like. However, it requires a great deal of skill to take photographs having various different gradations according to such a method. Even if the screen can be effectively handled, that operation is cumbersome.

It is an object of this invention to eliminate the above disadvantages of the prior art, that is to provide a photographic device and a method for taking a picture by which pictures having better gradation can easily be obtained.

SUMMARY OF THE INVENTION

The present invention more specifically relates to a photographic device comprising:

(a) a means for measuring luminous intensity distribution on an object; and (b) a means for controlling gradation of an image to be formed on a photosensitive material in accordance with said luminous intensity distribution and/or maximum/minimum luminous intensity difference of the object detected by said means (a).

The present invention also relates to a method for photographing an object having a luminous intensity distribution thereon, said method comprising measuring luminous intensity distribution and/or maximum/minimum luminous intensity difference of said object, disposing a screen member in front of a photosensitive material so as to control gradation of an image to be formed and exposing said photosensitive material to light from said object.

According to preferred embodiment, said means (b) is a screen member which is disposed in front of said photosensitive material, and more preferably an optical screen comprising an optically heterogeneous pattern consisting of relatively higher and lower transmission density portions for the light, said pattern being variable, as disclosed in the co-pending U.S. patent application Ser. No. 234,329 by the present co-inventors filed on Feb. 13, 1981, abandoned in favor of U.S. patent application Ser. No. 525,254, filed Aug. 19, 1983, entitled "Optical screen", which subject matter is herein incorporated by way of reference.

The means for measuring luminous intensity distribution which can be used in this invention includes a means for measuring the luminous intensity of an object in each of the multi-divided parts thereof. More particularly, it includes a means for measuring the luminous intensity in each part of the object by scanning the so-called multi-divided photometric element or spot photometric means. In this invention, the multi-divided photometric element is preferably utilized as in embodiments described hereinafter.

In the present invention, an image having an improved gradation are considered to be realized through a process that a certain pattern of the means (b) being disposed in front of a photosensitive material is formed in the image of an object to be formed.

The screen having an optically heterogeneous pattern can be operated according to the following methods. The first method includes the step of using a single screen having an optically heterogeneous pattern in response to the distribution and maximum/minimum difference of luminous intensity on an object. The second method utilizes a plurality of different screens which are selectively functioned depending on the distribution and maximum/minimum difference of luminous intensity on an object. The third method uses a screen having an optically heterogeneous pattern which comprises a region of relatively lower transmission density and another region of relatively higher transmission density, the transmission density difference between the lower and higher transmission density regions and/or the specific area in the lower transmission density region being variable depending on the distribution and maximum/minimum difference of luminous intensity on an object. The third method is most preferable in this invention. The screen having the optically hetereogeneous pattern will be described in more detail hereinafter. This invention can be applied to exposure devices which are used upon effecting the printing of color negative films and the like onto photosensitive materials such as color prints, in addition to cameras for taking photographs by the use of photosensitive materials such as color reversal films and instant print films.

This invention will now be described with reference to the accompanying drawings.

DETAILED DESCRIPTION

Figure 1:
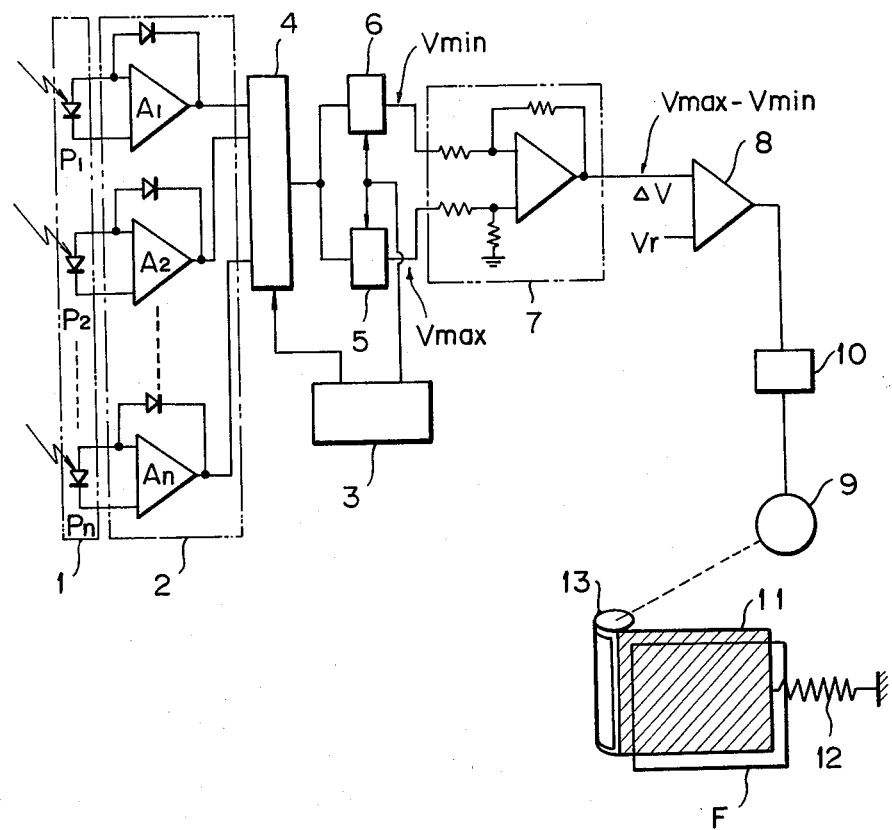
FIG. 1 is a diagrammatic view showing main part of a photographic device which is an embodiment of this invention.

FIG. 1 is a diagrammatic view showing the main part of a photographic device which is an embodiment of this invention. The photographic device comprises a multi-divided photometric element 1 including a plurality of sensors $P_1-P_n$, and a logarithmic amplifier circuit 2 which includes a plurality of operational amplifiers $A_1-A_n$ receiving at their inputs the respective output signals from the sensors $P_1-P_n$ of the multi-divided photometric element 1. The operational amplifiers $A_1$-$A_n$ have respective negative feedback lines connected with diodes. The device further includes a control circuit 3 and an analog switch 4 which causes the output signals from the logarithmic amplifier circuit 2 to emerge successively at the output of switch 4 by receiving control signals from the control circuit 3. The output signals from the analog switch 4 are respectively supplied to circuits 5 and 6 for respectively detecting the maximum and minimum values of these output signals. Detecting circuits 5 and 6 generate, at their outputs, voltages $V_{max}$ and $V_{min}$ corresponding to the maximum and minimum of the output voltages which are successively produced by the operational amplifiers in the logarithmic amplifier circuit 2. After one cycle wherein the output signals from all of the operational amplifiers $A_1$-$A_n$ have been coupled to the output of analog switch 4, the detecting circuits 5 and 6 are reset by the control circuit 3. The output signals from the analog switch 4 can be utilized to actuate other devices or circuits such as an automatic exposure circuit and the like.

The photographic device further comprises a subtraction circuit 7 including an operational amplifier and a resistor generating a voltage $\Delta V = V_{max} - V_{min}$ at the output thereof. $\Delta V$ corresponds to a difference between the brightest and the darkest in luminous intensity on an object. A comparator 8 compares the above voltage $\Delta V$ with a constant voltage $V_r$. A circuit 10 drives a the motor 9 in response to the output signal of the comparator 8 which represents the condition $\Delta V > V_r$, and a screen 11 is located in front of the exposed side of a photosensitive material F. A spring 12 urging the screen 11 toward a position spaced away from the exposure side of the photosensitive material F, and a winding drum 13 is connected with the screen 11 at the end thereof and rotated by the motor 9. When $\Delta V > V_r$, the screen 11 is in such a position as spaced apart from the exposure side of the photosensitive material F under the action of the spring 12. When $\Delta V > V_r$, however, the motor 9 is energized to draw out the screen in front of the exposure side of the photosensitive material F. In other words, when the difference between the brightest and the darkest in luminous intensity on an object is increased above a predetermined level, the screen 11 is drawn out in front of the exposure side of the photosensitive material F to completely perform its function.

The screen 11 is described, for example, in the RESEARCH DISCLOSURE, Vols. 175 and 182, issued respectively on November, 1978 and June, 1979 at the respective items 17533 and 18276. Such a screen has an optically heterogeneous pattern which comprises a region of relatively lower transmission density for the photographic light (hereinafter called the lower density region) and another region of relatively higher transmission density for the same light (hereinafter called the higher density region). The screen may have either dot, fine-lined or checkerboard pattern whether or not it is regularly arranged. It is desirable that the repeated pitch in the pattern may be at least such that one cannot feel any roughness on the photographed image. Therefore, it is preferred that there may be three repeated patterns per one millimeter. The transmission density in the lower density region is preferably as low as possible to make the loss of the light quantity minimum. The light-blocking property for the photographic light is preferably effective throughout the overall wavelength range. The transmission density difference between the higher and lower density regions and the specific area in the lower density region are determined depending on the photosensitive material used and others considering the points such that a screen having a larger transmission density difference increases the exposure range and that the gradation in the highly exposed region is mainly reduced due to the smaller specific area in the lower density region while the gradation in the shade zone is primarily decreased due to the larger specific area in the lower density region. The screen is most effective if it is used in contact with the photosensitive material.

In a photographic device into which such a screen 11 is incorporated, a maximum/minimum luminous intensity difference above a certain level on an object will automatically function to place the screen 11 in front of the exposure side of the photosensitive material F, whereby a photograph having better gradation and corrected contrast can be taken.

Figure 2:
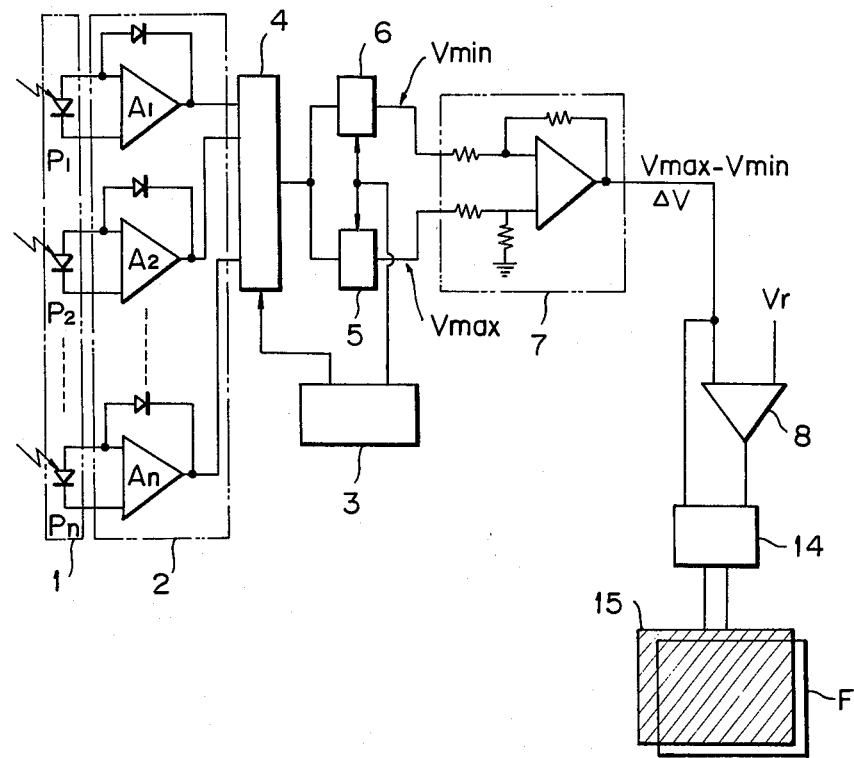
FIG. 2 is a diagrammatic view showing another embodiment of this invention.

FIG. 2 is a diagrammatic the main part of a photographic device which is another embodiment of this invention. The embodiment shown in FIG. 2 is similar to the previous embodiment shown in FIG. 1 except for the driving circuit and screen portions. Therefore, similar parts are designated by reference numerals similar to those in FIG. 1.

Figure 3:
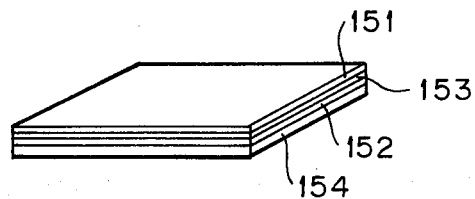
FIGS. 3 and 4 illustrate the detail of a screen which can be used in this invention.

This embodiment of FIG. 2 includes a driving circuit 14 receiving the output signals of the subtraction circuit 7 as well as the output signals from the comparator 8, and a screen 15 disposed in front of the exposure side of the photosensitive material F as in the previous embodiment in FIG. 1. However, this screen 15 is stationary, contrary to the embodiment in FIG. 1. An example of such a screen 15 is shown in FIG. 3. This screen comprises electrode layers 151 and 152, an electrochromic film 153 interposed between the electrode layers 151 and 152, and a substrate 154 of glass or the like.

Figure 4:
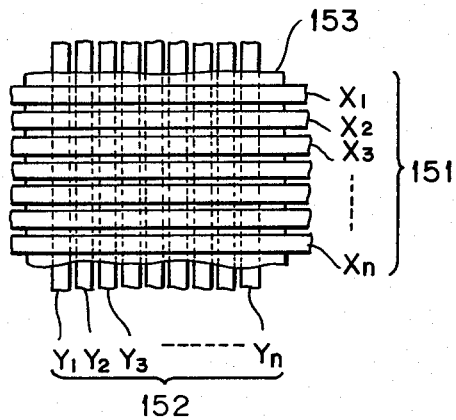

An enlarged part of the screen is shown in FIG. 4. As can be seen from FIG. 4, the respective electrode layers 151 and 152 include strip-like electrodes $X_1$-$X_n$ and $Y_1$-$Y_n$ which intersect at right angle with the electrochromic film 153 being interposed therebetween. The electrochromic film 153 is known in the field of displaying devices as an electrochromic display (ECD) which changes its transmission density depending on voltages applied thereto. The electrode layers 151, 152 and the substrate 154 are made of a transparent material.

Figure 5:
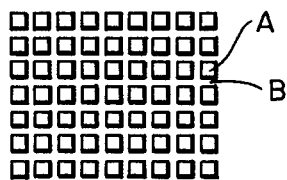
FIG. 5 is a view showing a pattern formed on the screen

If different voltages are applied to between the electrodes ($X_1$-$X_n$, $Y_1$-$Y_n$) of the screen, the overlapped regions of these electrodes will change their transmission densities to form a pattern based on the difference between the transmission densities. Such a pattern is shown in FIG. 5 wherein the overlapped regions of the electrodes is designated by "A" with the other regions being denoted by "B". The regions A and B correspond to the higher and lower density regions, respectively. Thus, the screen shown in FIGS. 2, 3 and 4 has the same function as that of the screen 11 shown in FIG. 1. The transmission density in the regions B is adapted to maintain such a value that it is always transparent or substantially transparent whether or not voltages are applied to the electrodes. On the other hand, the transmission density in the overlapped regions A varies depending on the applied voltages. In the screen 15, therefore, the transmission density difference between the higher and lower density regions can be changed by varying the voltage applied to the electrodes so that the photosensitive material used will be changed in gradation to regulate the gradation thereof more accurately. In the embodiment in FIG. 2, accordingly, a voltage is applied to the screen 15 as the voltage ΔV becomes larger than the voltage $V_r$ resulting in an optically heterogeneous pattern formed therein. Simultaneously, the transmission density in the higher density region is changed depending on the magnitude of the voltage ΔV. In order to obtain such a function, the driving circuit 14 is adapted to receive the output signals of the subtraction circuit 7 and the comparator 8.

In the embodiment shown in FIG. 2, the screen 15 may include several different combinations of the electrodes ($X_1$-$X_n$, $Y_1$-$Y_n$) which function to change the specific area in the lower density region. Depending on the maximum/minimum luminous intensity difference, a voltage will be applied to between the counter-electrodes of a selected combination.

Examples of the screen which can continuously regulate the gradation of the photosensitive material are described in the aforesaid co-pending patent application entitled "Optical screen". These screens includes a screen utilizing a liquid crystal film instead of said electrochromic film; a screen consisting of a rubber sheet of low transmission density on which a pattern of higher transmission density is printed or a semitransparent rubber sheet having a number of openings formed therethrough, the rubber sheet being deformably supported; a screen utilizing a polarizing sheet; and a screen including a transparent plate which has its higher density region across the depth and can be inclined.

According to this invention, any person may take photographs having better gradation because the contrast can automatically be corrected. And, yet, photographs having better gradation can be taken without any particular operation.

We claim:

1. A photographic device for photographing an image of an object on a photosensitive material, comprising:
    measuring means for measuring a luminous intensity distribution on the object to be photographed; and
    screen means including a screen member for controlling gradation of an image to be formed on a photosensitive material in accordance with the measured luminous intensity distribution on the object to be photographed;
    said screen member comprising an optical screen having an optically heterogeneous pattern consisting of relatively higher and lower transmission density portions for transmission of light therethrough, and said screen member being disposed in the proximate front of said photosensitive material so that said screen member is in the optical path between said object and said photosensitive material so that said pattern of said optical screen is photographed on the image of the object on said photosensitive material.

2. The photographic device of claim 1, wherein said optically heterogeneous pattern is arranged irregularly on said optical screen.

3. The photographic device of claim 1, wherein said optically heterogeneous pattern is variable, and said screen means includes means responsive to said measured luminous intensity distribution for varying said optically heterogeneous pattern as a function of said measured luminous intensity distribution.

4. The photographic device of claim 3, wherein said screen member comprises an electrochromic display device provided on a transparent substrate, said electrochromic display device including an electrochromic film sandwiched between two transparent electrode layers, each electrode layer having a number of electrodes and forming variable selected pairs of counter-electrodes whereat higher transmission density portions are to be formed and controlled to be varied in density by passage of the current therethrough.

5. The photographic device of claim 4, wherein said screen means includes means responsive to said measured luminous intensity distribution for generating an electrical signal corresponding to said measured luminous intensity distribution and means for coupling said electrical signal to said transparent electrode layers of said electrochromic display device for controlling the light transmission characteristics of said higher transmission density portions as a function of said measured luminous intensity distribution.

6. The photographic device of claim 1, wherein said screen means includes means responsive to said measured luminous intensity distribution for selectively moving said screen member between a first position in the proximate front of said photosensitive material and a second position out of the optical path between said object and said photosensitive material.

7. The photographic device of claim 6, wherein said means for moving said screen member comprises circuit means responsive to said measured luminous intensity distribution for generating a control signal; and motor means responsive to said control signal and coupled to said screen member for selectively moving said screen member between said first and second positions thereof.

8. The photographic device of claim 1, wherein said measuring means comprises a plurality of sensors.

9. The photographic device of claim 1, wherein said measuring means comprises a scanning spot photometric means.

10. A photographic device for photographing an image of an object on a photosensitive material, comprising:
    measuring means for measuring at least a maximum luminous intensity and a minimum luminous intensity on the object to be photographed; and
    screen means including a screen member for controlling gradation of an image to be formed on a photosensitive material in accordance with a predetermined relationship between the measured maximum and minimum luminous intensities on the object to be photographed;
    said screen member comprising an optical screen having an optically heterogeneous pattern consisting of a relatively higher and lower transmission density portions for transmission of light therethrough, and said screen member being disposed in the proximate front of said photosensitive material so that said screen member is in the optical path between said object and said photosensitive material so that said pattern of said optical screen is photographed on the image of the object on said photosensitive material.

11. The photographic device of claim 10, wherein said optically heterogeneous pattern is arranged irregularly on said optical screen.

12. The photographic device of claim 10, wherein said optically heterogeneous pattern is variable, and said screen means includes means responsive to said measured maximum and minimum luminous intensities for varying said optically heterogeneous pattern as a function of said measured maximum and minimum luminous intensities.

13. The photographic device of claim 12, wherein said means for varying varies said optically heterogeneous pattern as a function of the difference between said measured maximum and minimum luminous intensities.

14. The photographic device of claim 12, wherein said screen member comprises an electrochromic display device provided on a transparent substrate, said electrochromic display device including an electrochromic film sandwiched between two transparent electrode layers, each electrode layer having a number of electrodes and forming variable selected pairs of counter-electrodes whereat higher transmission density portions are to be formed and controlled to be varied in density by passage of the current therethrough.

15. The photographic device of claim 14, wherein said screen means includes means responsive to said measured maximum and minimum luminous intensities for generating an electrical signal corresponding to the difference between said measured maximum and minimum luminous intensities and means for coupling said electrical signal to said transparent electrode layers of said electrochromic display device for controlling the light transmission characteristics of said higher transmission density portions as a function of said electrical signal.

16. The photographic device of claim 10, wherein said screen means includes means responsive to said predetermined relationship of said measured maximum and minimum luminous intensities for selectively moving said screen member between a first position in the proximate front of said photosensitive material and a second position out of the optical path between said object and said photosensitive material.

17. The photographic device of claim 16, wherein said means for moving said screen member comprises circuit means for generating a control signal representative of said predetermined relationship between said measured maximum and minimum luminous intensities; and motor means responsive to said control signal and coupled to said screen member for selectively moving said screen member between said first and second positions thereof.

18. The photographic device of claim 16, wherein said means for selectively moving said screen member is responsive to the difference between said measured maximum and minimum luminous intensities.

19. The photographic device of claim 17, wherein said circuit means generates said control signal which is representative of the difference between said maximum and minimum luminous intensities.

20. The photographic device of claim 10, wherein said predetermined relationship is the difference between said measured maximum and minimum luminous intensities.

21. The photographic device of claim 10, wherein said measuring means comprises a plurality of sensors.

22. The photographic device of claim 10, wherein said measuring means comprises a scanning spot photometric means.

23. A method for photographing an image of an object on a photosensitive material, the object having a luminous intensity distribution thereon, said method comprising:
measuring the luminous intensity on said object at a plurality of points on said object;
disposing a screen member in the proximate front of said photosensitive material so that said screen member is in the optical path between said object and said photosensitive material, said screen member comprising an optical screen having an optically heterogeneous pattern consisting of relatively higher and lower transmission density portions for transmission of light therethrough, said pattern of said optical screen being photographed on the image of the object on said photosensitive material; and
controlling said screen member responsive to said measured luminous intensity distribution in accordance with said measured luminous intensity distribution.

24. The method of claim 23, wherein said step of controlling said screen member comprises selectively moving said screen member between a first position disposed in said proximate front of said photosensitive material and a second position out of the optical path between said object and said photosensitive material.

25. The method of claim 23, wherein said optically heterogeneous pattern is variable and said controlling step includes varying said optically heterogeneous pattern as a function of said measured luminous intensity distribution.

26. The method of claim 23, wherein said controlling step comprises controlling said screen member as a function of a relationship between a measured maximum and measured minimum luminous intensity on said object.

27. The method of claim 26, wherein said relationship is the difference between said measured maximum and measured minimum luminous intensity on said object.

* * * * *